United States Patent
Petel et al.

(10) Patent No.: US 9,845,070 B2
(45) Date of Patent: Dec. 19, 2017

(54) METHOD FOR TRIGGERING A COMMAND IN A MOTOR VEHICLE BY MEANS OF A DATA EXCHANGE BETWEEN A CONTROL DEVICE AND AN IDENTIFIER ELEMENT

(71) Applicant: VALEO COMFORT AND DRIVING ASSISTANCE, Creteil (FR)

(72) Inventors: Laurent Petel, Créteil (FR); Fabienne Masson, Créteil (FR); Frédéric Gehin, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 14/917,421

(22) PCT Filed: Sep. 8, 2014

(86) PCT No.: PCT/EP2014/069117
§ 371 (c)(1),
(2) Date: Mar. 8, 2016

(87) PCT Pub. No.: WO2015/032956
PCT Pub. Date: Mar. 12, 2015

(65) Prior Publication Data
US 2016/0221536 A1 Aug. 4, 2016

(30) Foreign Application Priority Data

Sep. 9, 2013 (FR) ...................................... 13 02104

(51) Int. Cl.
H04W 48/16 (2009.01)
B60R 25/24 (2013.01)

(52) U.S. Cl.
CPC ............ *B60R 25/24* (2013.01); *B60R 25/246* (2013.01); *B60R 2325/101* (2013.01); *B60R 2325/105* (2013.01)

(58) Field of Classification Search
CPC ... B60R 25/246; B60R 25/243; B60R 25/406; H04W 8/005; H04W 48/16; H04W 4/027
See application file for complete search history.

(56) References Cited

U.S. PATENT DOCUMENTS

| 2012/0007712 A1* | 1/2012 | Tung | B60R 25/243 340/5.72 |
| 2013/0040573 A1* | 2/2013 | Hillyard | H04W 8/005 455/41.2 |

(Continued)

FOREIGN PATENT DOCUMENTS

| CN | 202966231 U | 6/2013 |
| DE | 102010034977 A1 | 2/2012 |
| WO | 2008/002096 A1 | 1/2008 |

*Primary Examiner* — Yuri Kan
(74) *Attorney, Agent, or Firm* — Osha Liang LLP (57) ABSTRACT

The present invention essentially relates to a communication system comprising a communication device mounted in a motor vehicle and at least one mobile device (SP, CID, smart watch), said communication system being intended for providing a data exchange between the communication device and the at least one mobile device (SP, CID, smart watch), characterized in that: the communication device comprises a low-frequency communication interface (BF) and a wireless communication interface (11) using the Bluetooth Low Energy (BLE) protocol in "advertising" state; and in that the communication device is capable of communicating with said at least one mobile device either in low-frequency mode using the BLE protocol or using only the BLE protocol.

12 Claims, 4 Drawing Sheets

(56) References Cited

U.S. PATENT DOCUMENTS

| | | | | |
|---|---|---|---|---|
| 2014/0274042 A1* | 9/2014 | Teague | ............... | H04W 48/16 455/434 |
| 2014/0335902 A1* | 11/2014 | Guba | ................ | H04W 4/027 455/456.4 |
| 2015/0028995 A1* | 1/2015 | Gautama | ............ | B60R 25/406 340/5.72 |

* cited by examiner

METHOD FOR TRIGGERING A COMMAND IN A MOTOR VEHICLE BY MEANS OF A DATA EXCHANGE BETWEEN A CONTROL DEVICE AND AN IDENTIFIER ELEMENT

TECHNICAL FIELD OF THE INVENTION

The invention relates to a communication system comprising a communication device which is fitted in a motor vehicle, and at least one mobile device. Its subject is also a method for implementation of the system according to the invention.

Its purpose is substantially to increase the connectivity of the vehicle by making possible triggering of commands in a motor vehicle by means of mobile devices which are devices with functionalities which are not limited to those of the motor vehicle industry, whilst maintaining the possibility of triggering said commands by means of the identifier elements which have been used hitherto.

Within the context of the present invention, the expressions "mobile device" or "identifier element" designate any element or device which is authorized to give rise in particular to opening of the motor vehicle concerned. It can thus consist of a key, a badge, or any other means, for example of the smartphone or digital tablet type, which, in the system according to the invention, or by implementation of the method according to the invention, will be authorized to trigger different commands in the vehicle concerned. In general, the term "smartphone" is a generic term which in the present description incorporates other communication products which can exchange data according to the BLE protocol, and in particular digital tablets.

PRIOR ART

Nowadays certain motor vehicles comprise a control device or equipment which is arranged in a fixed manner inside the motor vehicle. This control device is responsible in particular for controlling in a secure manner requests received from accessories in the possession of the user (electronic key, badge, etc.) in order to determine if the request emitted should give rise to a command (unlocking the doors, starting the vehicle for example) in the vehicle. For this purpose, the control device exchanges data by means of short-range waves with identifier elements which are associated with the vehicle concerned.

The identifier elements can nowadays be for example an electronic key, sometimes known as a "plip", or a free-hand key in the form of an electronic badge. These identifier elements store identifier codes which are recognized by the motor vehicle with which they are paired, i.e. with which they are associated definitively in order to recognize one another. An exchange of data which makes it possible to result in a command for the vehicle, for example a command for unlocking the doors or a command for starting the vehicle, takes place between the electronic control device of the vehicle and the identifier element. Another example of a command for the vehicle can also consist of a so-called "parking" command consisting of an automatic maneuver by means of which the vehicle is parked or moves without the driver necessarily being present inside.

In a first example of exchanges of data, designated as RKE (Remote Keyless Entry) mode, an action is carried out, typically pressing a button, on an identifier element of the electronic key type. This action gives rise to emission by said electronic key of a radiofrequency (RF) signal typically at 433 MHz. If the control device of the vehicle recognizes the identifiers conveyed by the RF signal, then it gives rise to an appropriate command for the vehicle, for example unlocking the doors.

In another example of exchanges of data, designated as "PEPS (Passive Entry/Passive Start) mode", an action is carried out on the vehicle, for example grasping an outer handle of a door. The vehicle detects this action, and by means of its control equipment emits a low frequency signal at 125 kHz. This is received by the identifier element, which returns a radiofrequency (RF) signal typically at 433 MHz, in order to be identified, and if applicable recognized by the control equipment of the vehicle, in order to give rise to an appropriate command for the vehicle concerned.

If these systems function correctly and become part of the habits of use of the vehicle owners, they remain closed systems, i.e. systems which use a specific communication protocol between the identifier element and the control device. Other devices which, because of their light and mobile nature, could act as an identifier element for the vehicle, can therefore not access these functionalities because of the specificity of the protocol which has existed hitherto. This is the case for example for devices of the smartphone type which are becoming increasingly commonplace.

SUMMARY OF THE INVENTION

The objective of the invention is in particular to eliminate the problem which has just been identified, in order to allow new equipment of the mobile device type, in particular of the smartphone, digital tablet or smart watch type, to act as an identifier element for a vehicle concerned. The protocol to be used must be able to be integrated easily in the identifier elements which already exist, such as digital keys or electronic tablets. It must also limit the consumption of energy, in particular for the elements which will implement it, and are not easy to recharge—typically electronic keys.

For this purpose, in the invention it is proposed to use in particular a specific communication protocol between the control device of the vehicle and the identifier element, said communication protocol being the BLE ((Bluetooth Low Energy) protocol—low energy consumption version); the BLE protocol is used in an optimized manner, in particular in order to control the existing energy resources in the best possible way. The BLE protocol is also known by the name of Bluetooth Smart (registered trademark).

A brief reminder is now given that the BLE protocol defines a communication protocol between a first element which is designated as a master, and at least one second element, which is designated as a slave. Each element can adopt a state from amongst the following five modes:

Standby mode: the element concerned is paused; it neither emits nor receives signals, it does nothing. It neither emits nor receives RF. It is in very low consumption mode.

Scanning mode: the element is in a scanning phase, searching for other elements which are exchanging according to the same protocol as itself in the vicinity.

Advertising mode: the element emits signals. These signals are designed to indicate to other elements which are exchanging according to the same protocol as itself that it can make itself available for an exchange of data.

Initiating mode: when a first element in a scanning mode encounters a second element in an advertising mode, the first element goes into initiating mode in order to attempt to initiate a connection.

Connected mode: after the exchange of different control identifiers, the initiating phase has made it possible to lead to a phase where the first element and the second element are in a connection mode in which they can exchange data. Once connected, the data is exchanged in both directions.

The choice of one mode or another for the vehicle or the identifier and the duration of maintenance in a given mode are determining factors for obtaining a system which is optimized in terms of response time and in terms of consumption.

In the invention, the use of the BLE protocol is therefore proposed in order to control exchanges of data between an identifier element of the mobile device type, associated with a vehicle and a control device, which is also designated as a communication device, of said vehicle, for the purpose of triggering a command in the vehicle. Use of the BLE protocol is thus implemented in a communication system according to the invention, such that the vehicle is equipped with a communication device which can communicate firstly in low-frequency mode and according to the BLE protocol, and secondly according to the BLE protocol alone.

This implementation allows the communication system to be as efficient as possible in terms of energy consumption and reactivity of the equipment, vehicle and mobile devices which implement it.

Adoption of the BLE protocol also ensures the possibility of using as an identifier element electronic devices of the smartphone type which function with this type of protocol. Advantageously, it is then no longer necessary to maintain a radio device, both at the level of the identifier element of the mobile device type and that of the control device which ensured exchanges according to the prior art, by means of waves between these two elements in a frequency range of between 433 MHz and 869 MHz (with the radio devices which ensure control of the low frequencies at 125 kHz being retained on the other hand). This radio device is then replaced by a more standard receiver which will make it possible to provide greater connectivity of the system.

Taking into consideration the fact that for establishment of a BLE connection between two devices, at least one of them must initially be in an advertising mode, according to the invention it is advantageously also proposed to place the mobile device in the advertising mode of the BLE protocol at least for as long as no exchange of data has started with a communication device fitted in the vehicle.

The present invention thus relates substantially to a communication system comprising a communication device which is fitted in a motor vehicle, and at least one mobile device, said communication system being designed to ensure an exchange of data between the communication device and the at least one mobile device, characterized in that the communication device comprises a low-frequency communication interface and a wireless communication interface according to the Bluetooth Low Energy protocol in the advertising state; and in that the communication device can communicate with said at least one mobile device, firstly in low-frequency mode and according to the BLE protocol; and secondly according to the BLE protocol alone.

In addition to the characteristics described in the preceding paragraph, the communication system according to the invention can have one or more complementary characteristics from amongst the following, considered individually or according to all the technically possible combinations:

said at least one mobile device is a smartphone comprising a wireless communication interface according to the BLE protocol in the advertising state.

said at least one mobile device is an identifier CID comprising: a low-frequency communication interface BF'; a wireless communication interface I2' according to the BLE protocol in the standby state.

The present invention also relates to a method for implementation of the system according to the invention, characterized in that it comprises a step during which, after a triggering event in the vehicle, the vehicle interface according to the BLE protocol goes from the advertising state to the scanning state.

In addition to the characteristics described in the preceding paragraph, the method for implementation of the system according to the invention can have one or more complementary characteristics from amongst the following, considered individually or according to all the technically possible combinations:

the method according to the invention comprises:

a step in which, after the triggering event, the low-frequency communication interface of the vehicle sends a signal.

a step in which, after receipt of the signal by the low-frequency communication interface of the identifier, the BLE interface of the identifier goes from the standby state to the advertising state.

the triggering event is the activation of a handle of a door of the vehicle.

the triggering event is the activation of a button for starting, and of the vehicle.

the method comprises a step in which, after a predetermined time has elapsed, the BLE interface of the mobile device goes into the scanning state.

the method comprises a step in which, after an action on the mobile device, the BLE interface of the mobile device goes into the initiating state.

the mobile device is provided with a tactile interface, and the action on the mobile device is activation via the tactile interface.

the mobile device is provided with a remote control button, and the action on the mobile device is activation of the remote control button.

BRIEF DESCRIPTION OF THE DRAWINGS

Other characteristics and advantages of the invention will become apparent from examining the following detailed description and the appended drawings, in which.

DETAILED DESCRIPTION

FIGS. 1 to 4 follow the same formalism, with each figure showing in the left-hand column the mode observed for the identifier element, and in the right-hand column the mode observed of the BLE protocol for the control device, also designated as the communication device, in the vehicle, during implementation of the corresponding embodiment of the method according to the invention. In each column, the events follow one another chronologically according to the different successive modes adopted by the identifier element or the control device. The situations shown at the same height in the left-hand column and in the right-hand column are observed simultaneously.

Figure 1:
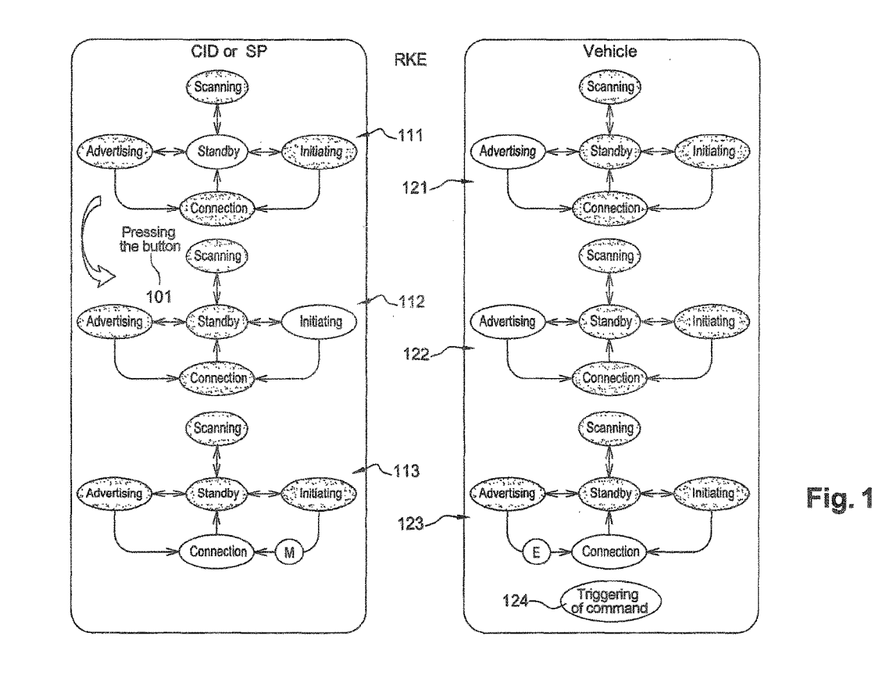
FIG. 1 illustrates a first embodiment of the method according to the invention.

FIG. 1 illustrates a first embodiment of the method according to the invention, designated as the RKE mode. This embodiment can use any identifier element of the mobile device type, in particularly of the electronic key or electronic badge type (designated by the common acronym CID for "Client IDentifier") or smartphone (SP).

In the initial configuration of this embodiment, the identifier element is in a state 111 corresponding to the BLE standby mode, if the mobile device concerned is of the CID type, and in a state corresponding to the BLE advertising mode, if the mobile device concerned is of the smartphone type; the control device of the vehicle is in a state 121 corresponding to the BLE advertising mode.

When a characteristic event has taken place, in this case consisting of pressing a button 101, or a combination of buttons, of the mobile device, corresponding to the expression by a user of a command in the motor vehicle, for example a command to unlock the doors or a command to start the vehicle, in a state 112 the identifier element then adopts a BLE initiating mode, with the control device being maintained in a state 122 in BLE advertising mode. In the case when the mobile device is of the CID type, pressing a button corresponds to pressing a remote control button; in the case when the mobile device is of the smartphone type, pressing a button corresponds to activation of a tactile interface of the smartphone concerned. If the command corresponds to a wish to park the vehicle, then the button must be kept pressed throughout the duration of the parking operation.

Adoption of the states 112 and 122 respectively by the identifier element and by the control device then permits an exchange of control information according to the BLE protocol. The exchange of control information serves the purpose of checking whether the identifier element and the control device are authorized to establish a connection according to the BLE protocol between one another. If the identifier element and the control device have previously been associated in order to recognize one another, a connection of this type can be authorized.

The exchange of control information thus makes it possible in a following step to lead to a connection between the identifier element and the control device, which adopt respectively a state 113 and a state 123 in BLE connected mode. Once they are connected, the identifier element and the control device exchange data by means of which the control device receives a command from the identifier element, which command it triggers in a step 124.

In an alternative embodiment, not represented, with an identifier of the smartphone SP type, the latter can already be in BLE passive scanning or active scanning mode, whereas the vehicle is still in the advertising state. In this embodiment, the identifier of the smartphone SP type then goes into BLE initiating mode after the button has been pressed.

Figure 2:
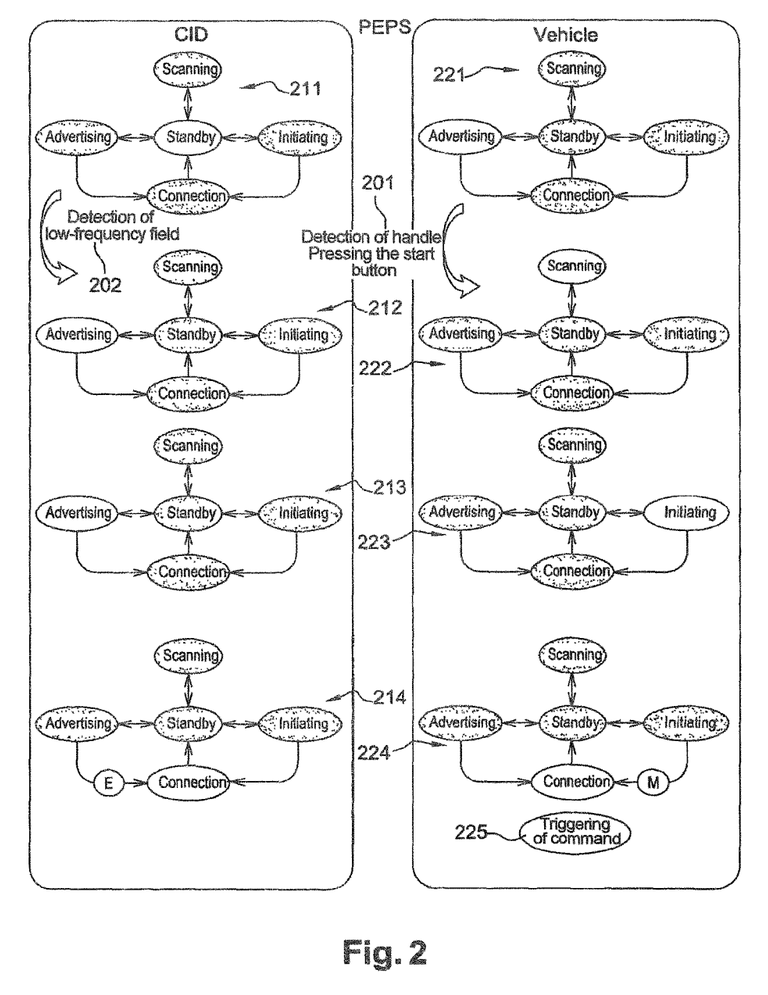
FIG. 2 illustrates a second embodiment of the method according to the invention in which a first type of identifier element is used.

FIG. 2 illustrates a second embodiment of the method according to the invention designated as the PEPS mode, in which the identifier element involved is of the CID type.

In the initial configuration of this embodiment, the identifier element is in a state 211 corresponding to the BLE standby mode, and the control device is in a state 221 corresponding to the BLE advertising mode.

When a characteristic event 201 has taken place, in this case consisting of action on a door handle, typically grasping said handle in order to try to open the door, or consisting of pressing a starter button of the vehicle (said starter button being able to be placed for example on the dashboard of the vehicle, but also on the smartphone in the form of a key or a combination of keys), corresponding to the expression of the will of a user for a command in the motor vehicle, for example a command to unlock the doors or a command to start the vehicle, the vehicle emits a low frequency signal to the identifier element of the CID type. The low-frequency signal contains a wake-up message. Thus, the woken CID then adopts a BLE advertising mode in a state 212, with the control equipment for its part adopting a BLE scanning mode in a state 222.

In a following step, the identifier element of the CID type is maintained in a state 213 in BLE advertising mode, whereas, in a state 223, the control device adopts a BLE initiating mode.

The adoption of the states 213 and 223 respectively by the identifier element of the CID type and by the control device then authorises an exchange of control information according to the BLE protocol. In this case also, the exchange of control information serves the purpose of checking whether the identifier element and the control device are authorized to establish between one another a connection according to the BLE protocol. It should be noted that, if the identifier element and the control device have previously been paired, the control device then advantageously goes from the advertising state 221 to the initiating state 223, without going via the scanning state 222.

The exchange of control information thus makes it possible to lead, in a following step, to a connection between the identifier element of the CID type and the control device, which adopt respectively a state 214 and a state 224 in BLE connected mode. In this example, it is the identifier element of the CID type which act as a slave E, and the control equipment which acts as a master M, in the exchanges of data which will follow. Once connected, the identifier element of the CID type and the control device exchange data by means of which the control device receives a command from the identifier element, which command it triggers in a step 225.

In an improved embodiment, the low-frequency signal also contains an authentication challenge in relation to the CID. In this case, the response to this challenge is sent in the advertising frame, and the order for execution of the command takes place if the response to the challenge is the one expected, whilst keeping the vehicle in the scanning mode.

Figure 3:
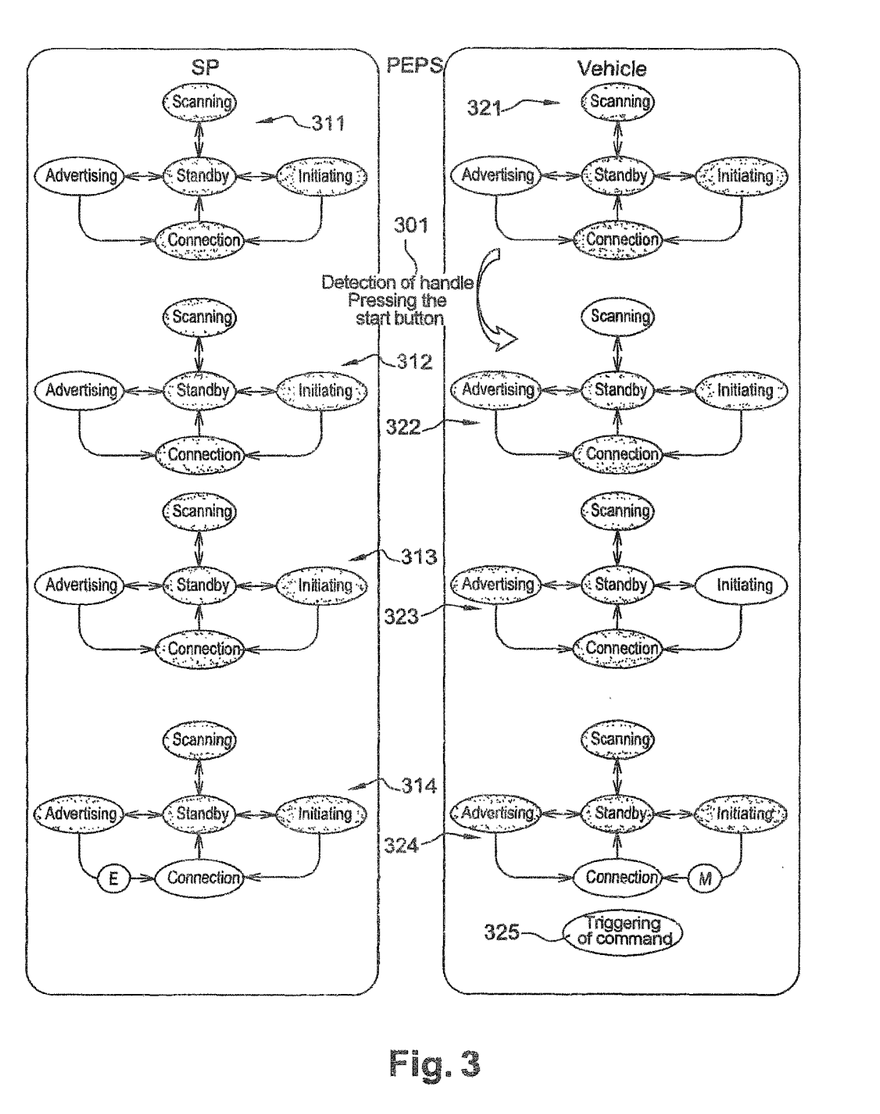
FIG. 3 illustrates the second embodiment of the method according to the invention in which a second type of identifier element is used.

FIG. 3 illustrates a third embodiment of the method according to the invention, designated as the PEPS mode, as in the previous example which has just been described, but in which the identifier element involved is of the smartphone SP type.

In the initial configuration of this embodiment, the identifier element is in a state 311 corresponding to the BLE advertising mode, the control device also being in a state 321 corresponding to the BLE advertising mode.

When a characteristic event 301 has taken place, in this case consisting of action on a door handle, typically grasping said handle in order to try to open the door, or consisting of pressing a starter button of the vehicle, corresponding to the expression of the will of a user for a command in the motor vehicle, for example a command to unlock the doors or a command to start the vehicle, in a state 312 the identifier element of the smartphone type then adopts a BLE advertising mode, with the control equipment going into a BLE scanning mode in a state 322.

In a following step, the identifier element of the smartphone type is maintained in a state 313 in BLE advertising mode, whereas, in a state 323, the control device adopts a BLE initiating mode.

The adoption of the states 313 and 323 respectively by the identifier element of the smartphone type and by the control device then authorizes an exchange of control information according to the BLE protocol. In this case also, the exchange of control information serves the purpose of verifying whether the identifier element and the control device are authorized to establish between one another a connection according to the BLE protocol. In this case also, it should be noted that if the identifier element and the control device have previously been paired, the control device then advantageously goes from the advertising state 221 to the initiating state 223, without going via the scanning state 222.

The exchange of control information thus makes it possible to lead, in a following step, to a connection between the identifier element of the smartphone type and the control device, which adopt respectively a state 314 and a state 324 in BLE connected mode. In this example, it is the identifier element of the smartphone type which acts as a slave E, and the control device which acts as a master M in the exchanges of data which will follow. Once connected, the identifier element of the CID type and the control device exchange data by means of which the control device receives a command from the identifier element, which command it triggers in a step 325.

In an alternative embodiment, not represented, the objective is to carry out intervention of the CID as a master M, and intervention of the vehicle as a slave E.

In this embodiment, after a characteristic event has taken place, in this case consisting of action on a door handle, typically grasping said handle in order to try to open the door, or consisting of pressing a starter button of the vehicle, corresponding to the expression of the will of a user for a command in the motor vehicle, for example a command to unlock the doors or a command to start the vehicle, the vehicle emits a low-frequency signal to the identifier element of the CID type. The low-frequency signal contains a wake-up message. Thus, the woken CID then adopts a BLE scanning mode, with the control device maintaining a BLE advertising mode.

In a following step, the identifier element of the CID type adopts a BLE initiating mode, whereas the device is maintained in BLE advertising mode.

Adoption of the initiating and advertising states respectively by the identifier element of the CID type and by the control device then authorises an exchange of control information according to the BLE protocol. In this case also, the exchange of control information serves the purpose of verifying whether the identifier element and the control device are authorized to establish between one another a connection according to the BLE protocol. It should be noted that if the identifier element and the control device have previously been paired, the identifier element of the CID type then advantageously goes from the advertising state to the initiating state, without going via the scanning state.

The exchange of control information thus makes it possible to lead, in a following step, to a connection between the identifier element of the CID type and the control device, which are placed in BLE connected mode. In this example, it is the identifier element of the CID type which acts as a master M, and the control device which acts as a slave E in the exchanges of data which will follow. Once connected, the identifier element of the CID type and the control device exchange data, by means of which the control device receives a command from the identifier element, which command it triggers.

Also, in yet another embodiment, in the case when an acting identifier element of the smartphone SP type is used in the place of the CID, the embodiment described on the basis of FIG. 3 is modified accordingly, in order to proceed with intervention by the smartphone SP as a master M, and by the vehicle as a slave E, as was carried out in the case of the CID described on the basis of FIG. 2.

Thus, when a characteristic event has taken place, in this case consisting of action on a door handle, typically grasping said handle in order to try to open the door, or consisting of pressing a starter button of the vehicle, corresponding to the expression of the will of a user for a command in the motor vehicle, for example a command to unlock the doors or a command to start the vehicle, the identifier element of the smartphone type which is initially in the passive scanning or active scanning mode goes into the initiating mode, after updating of the state of the handle and/or of the button indicated in the advertising frame of the control device.

The exchange of control information thus makes it possible to lead, in a following step, to a connection between the identifier element of the smartphone type and the control device, which adopt respectively a BLE connected mode.

In this example, it is the identifier element of the smartphone type which acts as a master M, and the control device which acts as a slave E, in the exchanges of data which will follow. Once connected, the identifier element of the smartphone SP type and the control device exchange data by means of which the control device receives a command from the identifier element, which command it triggers.

Figure 4:
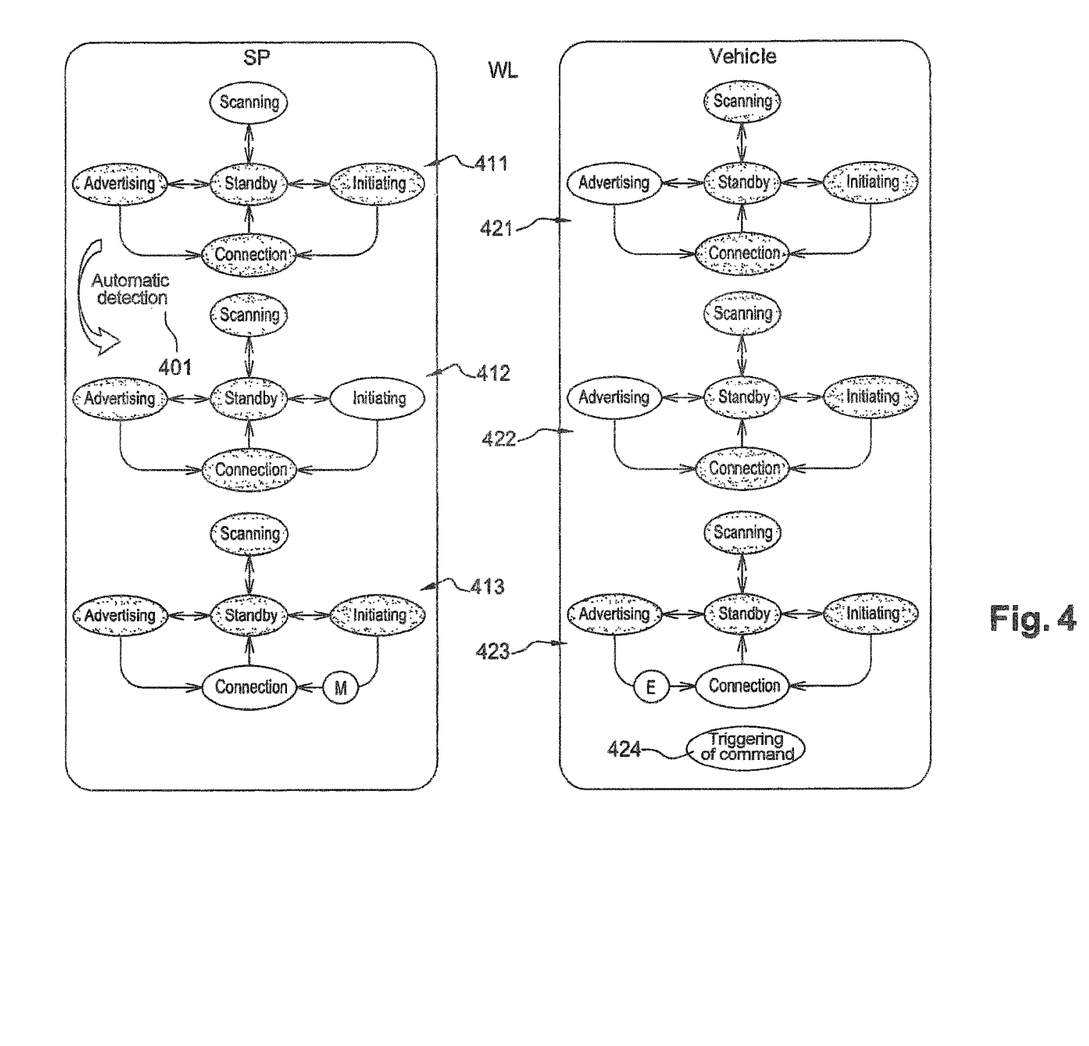
FIG. 4 illustrates a first embodiment of the method according to the invention.

FIG. 4 illustrates a fourth embodiment of the method according to the invention, designated as the WL (Welcome Lighting) mode. This embodiment uses an identifier element of the smartphone SP type.

In the initial configuration of this embodiment, the identifier element is in an initial state, not represented, corresponding to the BLE advertising mode; after a predetermined time has elapsed, this state goes into a state 411 corresponding to the BLE scanning mode, and the control device is in a state 421 corresponding to the BLE advertising mode.

When a characteristic event has taken place, in this case consisting of entry 401 of the identifier element into an area of automatic detection (corresponding to an area situated in the immediate vicinity of said vehicle, typically approximately twenty meters at the most) of said identifier element by the control device of the vehicle, in a state 412 the identifier element then adopts a BLE initiating mode, with the control device being maintained in a state 422 in BLE advertising mode.

Adoption of the states 412 and 422 respectively by the identifier element of the smartphone type and by the control device then authorizes an exchange of control information according to the BLE protocol.

The exchange of control information then makes it possible to lead, in a following step, to a connection between the identifier element and the control device, which adopt respectively a state 413 and a state 423 in BLE connected mode. In this example, it is the identifier element of the smartphone type which acts as a master M, and the control device which acts as a slave E, in the exchanges of data which will follow. Once connected, the identifier element and the control device exchange data by means of which the control device receives a command from the identifier element, which command it triggers in a step 424.

In an alternative of this last operative mode, the smartphone is replaced by an identifier element of the CID type. The latter is in an initial state corresponding to the BLE standby mode, instead of the advertising state in the case of the smartphone. The remainder of the elements described for the smartphone remain identical with the CID.

In an additional embodiment, not represented, with an identifier of the smartphone SP type, the latter can initially be in BLE passive scanning or active scanning mode, whereas the vehicle is still in the advertising state. In this embodiment, the identifier of the smartphone SP type then goes into BLE initiating mode, after a characteristic event has taken place, in this case consisting of entry of the identifier element into an area of automatic detection (corresponding to an area situated in the immediate vicinity of said vehicle, typically approximately twenty meters at the most) of said identifier element by the control device of the vehicle, the control device being maintained in a BLE advertising mode.

In all the examples described, once the command has been triggered, if the mobile device is of the CID type, it goes back into a BLE standby state, and if it is of the smartphone type, it goes back into an advertising state.

As a result of use of the BLE protocol, the method according to the invention thus provides many advantages in comparison with the solutions which exist in the prior art, i.e.:

reduced size of the data packets exchanged;
 reduced frequency spectrum range (approximately 2.4 GHz), which limits the risks of interference with other exchanges of data which may intervene for other applications associated with the vehicle;
 long distance (approximately 100 m) for which connection between the identifier element and the control device is possible;
 strength of the data transfers, because of use in the BLE protocol of a 24-bit CRC;
 secure exchanges (Full AES-128 encryption);
 reduced reaction time for establishment of a secure connection (typically approximately 10 ms).

The invention claimed is:

1. A communication system comprising:
 a communication device which is fitted in a motor vehicle; and
 at least one mobile device,
 said communication system being configured to ensure an exchange of data between the communication device and the at least one mobile device,
 the communication device comprising a low-frequency communication interface and a wireless communication interface according to Bluetooth Low Energy (BLE) protocol in an advertising state,
 wherein the communication device communicates with said at least one mobile device, firstly in low-frequency mode and according to the BLE protocol, and secondly according to the BLE protocol alone, and
 wherein after a triggering event, the wireless communication interface according to the BLE protocol switches from the advertising state to a scanning state.

2. The communication system as claimed in claim 1, wherein said at least one mobile device is a smartphone comprising a wireless communication interface according to the BLE protocol in the advertising state.

3. The system as claimed in claim 1, wherein said at least one mobile device is a mobile communication and information device (CID) comprising:
 a low-frequency communication interface; and
 a wireless communication interface according to the BLE protocol in a standby state.

4. The system as claimed in claim 1, wherein the triggering event occurs in the motor vehicle.

5. A method comprising:
 an exchange of data between a communication device and at least one mobile device, the communication device comprising a low-frequency communication interface and a wireless communication interface according to Bluetooth Low Energy (BLE) protocol in an advertising state;
 after a triggering event in the vehicle, the wireless communication interface according to the BLE protocol switches from the advertising state to a scanning state;
 after the triggering event, the low-frequency communication interface of the motor vehicle sends a signal; and
 after receipt of the signal by a low-frequency communication interface of a mobile communication and information device (CID), a BLE interface of the (CID) switches from a standby state to the advertising state.

6. The system as claimed in claim 1, wherein the triggering event is an activation of a handle of a door of the vehicle.

7. The system as claimed in claim 1, wherein the triggering event is an activation of a button for starting, and of the vehicle.

8. The method as claimed in claim 5, wherein the triggering event consists of a predetermined time that has elapsed.

9. The method as claimed in claim 5, further comprising after an action on the mobile device, the BLE interface of the mobile device switches into an initiating state.

10. The method as claimed in claim 9, wherein the mobile device is provided with a tactile interface, and the action on the mobile device is activation via the tactile interface.

11. The method as claimed in claim 9, wherein the mobile device is provided with a remote control button, and the action on the mobile device is activation of the remote control button.

12. The system of claim 1, wherein the mobile device is a smart watch.

* * * * *